(12) United States Patent
Kwak et al.

(10) Patent No.: US 7,496,075 B2
(45) Date of Patent: Feb. 24, 2009

(54) USER EQUIPMENT AND METHOD FOR CONTROLLING DATA RATE THEREOF

(75) Inventors: No-Jun Kwak, Seoul (KR); Gert Jan Van Lieshout, Middlesex (GB); Kook-Heui Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 414 days.

(21) Appl. No.: 11/410,314

(22) Filed: Apr. 25, 2006

(65) Prior Publication Data

US 2007/0060138 A1 Mar. 15, 2007

(30) Foreign Application Priority Data

Apr. 25, 2005 (KR) .................. 10-2005-0034253

(51) Int. Cl.
 *H04B 7/216* (2006.01)
(52) U.S. Cl. .................. 370/335; 370/342; 370/328; 370/338; 455/418; 455/423
(58) Field of Classification Search .................. 370/335, 370/342, 328, 338; 455/418, 423
See application file for complete search history.

(56) References Cited

U.S. PATENT DOCUMENTS

2003/0003914 A1* 1/2003 Kubo et al. .................. 455/441

OTHER PUBLICATIONS

Panasonic: "Successive non-serving/serving RG and hysteresis"; 3GPP TSG RAN 2#46BIS, R2-050914; Apr. 4, 2005-Apr. 8, 2005; pp. 1-4.
Siemens: "On reception of RG Down commands from neighbour cells"; 3GPP TSG RAN2#46, R2-050627; Feb. 2005, pp. 1-4.
Samsung: "Non-serving RLS E-RGCH handling" 3GPP TSG RAN 2 #47, R2-051511, May 9, 2005-May 13, 2005; pp. 1-7.
"Universal Mobile Telecommunications System (UMTS); FDD enhanced uplink; Overall description; Stage 2 (3GPP TS 25.309 version 6.2.0 Release 6); ETSI TS 125 309".

* cited by examiner

*Primary Examiner*—Nghi H Ly
(74) *Attorney, Agent, or Firm*—Roylance, Abrams, Berdo & Goodman, L.L.P.

(57) ABSTRACT

An apparatus and method for controlling a data rate by a user equipment (UE) that receives a scheduling command for uplink data transmission from a non-serving Node B in a mobile communication system that transmits packet data over an uplink are provided. A scheduling command receiver receives a down command for decreasing an allowable data rate of the UE from radio link sets (RLSs) of the non-serving Node Bs. A down command reception counter counts the number of down commands received from each of the RLSs for a predetermined hysteresis period. A down command execution counter counts the number of down commands executed for the hysteresis period. A down command execution decision unit compares the number of received down commands with the number of executed down commands, and determines whether to execute the down command according to the comparison result.

11 Claims, 8 Drawing Sheets

USER EQUIPMENT AND METHOD FOR CONTROLLING DATA RATE THEREOF

CROSS REFERENCE TO RELATED APPLICATIONS

This application claims the benefit under 35 U.S.C. § 119(a) of a Korean Patent Application filed in the Korean Intellectual Property Office on Apr. 25, 2005 and assigned Serial No. 2005-34253, the entire disclosure of which is hereby incorporated by reference.

BACKGROUND OF THE INVENTION

1. Field of the Invention

The present invention relates generally to a mobile communication system that transmits packet data over an uplink. More particularly, the present invention relates to a method and apparatus for controlling a data rate of user equipments in a mobile communication system.

2. Description of the Related Art

In Wideband Code Division Multiple Access (WCDMA) communication systems, Enhanced Uplink Dedicated Channels (E-DCHs) are used. The E-DCH has been aiming to increase packet transmission performance through an introduction of new technology in uplink communications in the WCDMA communication system.

The newly introduced technology can include Node-B based scheduling as well as Adaptive Modulation and Coding (AMC) and Hybrid Automatic Retransmission Request (HARQ) used in the existing High Speed Downlink Packet Access (HSDPA).

FIG. 1 is a basic conceptual diagram which shows where E-DCH may be used.

Referring to FIG. 1, the WCDMA communication system includes a Node B 100 supporting E-DCH and a plurality of user equipments (UEs) 101, 102, 103 and 104 receiving the E-DCH.

Node B 100 monitors channel conditions and buffer states of the UEs 101 to 104 supporting E-DCH, generates a scheduling command depending on the monitoring results, and transmits the scheduling command to each of the UEs. The UEs 101 to 104 determine a maximum allowable data rate of uplink E-DCH data according to the scheduling command, and transmit the data at the determined data rate.

However, in the uplink, the uplink signals transmitted by different UEs are not synchronized (or not orthogonal) with each other, thus serving as interference to each other. As a result, an increase in a number of uplink signals received at Node B increases the interference to an uplink signal of a particular UE, causing degradation of reception performance. In order to address this problem, transmission power of the uplink may be increased, but also serves as interference to other uplink signals, causing deterioration of reception performance. Due to these problems, there is a limitation on the received power level of the uplink signals, at which Node B can receive the uplink signals, guaranteeing the reception performance. This will be described using Rise-Over-Thermal (ROT) defined as $$ROT = I_o/N_o \quad (1)$$

In Equation (1), $I_o$ denotes the total amount of uplink signals received at Node B, which is the received total broadband power spectral density of Node B, and $N_o$ denotes thermal noise power spectral density of Node B. Therefore, the allowed maximum ROT can be the radio resource available by Node B in the uplink, that is, the received total wideband power (RTWP) available by Node B in the uplink.

FIG. 2 is a ladder diagram illustrating a basic procedure for transmitting/receiving an E-DCH.

Referring to FIG. 2, the communication system includes a UE 202 receiving an E-DCH and a Node B 201 to which the UE 202 belongs.

In step 203, E-DCH setup between Node B 201 and the UE 202 is achieved for transmission/reception of an E-DCH. The setup process includes a process of delivering messages over a dedicated transport channel. In step 204, the UE 202 provides scheduling information to Node B 201. The scheduling information can include UE's transmission power information based on which uplink channel information can be found, and can also include information on the residual power transmittable by the UE, or information on the amount of transmission data piled up in a buffer of the UE. Upon receiving the scheduling information from several UEs, Node B 201 schedules each of the UEs while monitoring the scheduling information from several UEs in step 211.

If Node B 201 determines to perform scheduling for allowing the UE 202 to transmit uplink packets, Node B 201 transmits scheduling assignment information to the UE 202 in step 205. Then the UE 202 determines a transport format (TF) of the E-DCH to be transmitted in the uplink direction using the scheduling assignment information in step 212, and transmits the TF information and the E-DCH to Node B 201 in steps 206 and 207.

Upon receiving the E-DCH, Node B 201 determines in step 213 whether there is any error in the received TF information and E-DCH. In step 208, the Node B 201 transmits Negative Acknowledgement (NACK) information to the UE 202 if there is an error, and transmits Acknowledgement (ACK) information to the UE 202 if there is no error.

If the ACK information is transmitted in step 208, transmission of the E-DCH information in step 207 is terminated so the UE 202 can transmit new information over the E-DCH. However, if the NACK information is transmitted in step 208, the UE 202 retransmits the same information over the E-DCH.

Next, a description will be made of a scheduling method performed by Node B 201. The scheduling method can be roughly classified into a rate scheduling method and a time and rate scheduling method.

In the rate scheduling method, a Node B increases/keeps/decreases a data rate by a predetermined level every scheduling period for all UEs requiring E-DCH service. That is, in the system where the TF is set such that a UE may have data rates of 16, 32, 128, 256, 384, and 568 kbps, and a Node B increases/keeps/decreases the data rate step by step, if the currently allocated maximum data rate is 16 kbps and Node B issues an Up (or Increase) command in the next scheduling period, the maximum allowable data rate is increased from 16 kbps to 23 kbps by one level. The rate scheduling method, which schedules many UEs, may bring a signaling overhead when the amount of signaling information transmitted every time is large. Therefore, the rate scheduling method transmits the scheduling information using a relative grant. In the relative grant-based scheduling method, if Node B signals limited information such as +1/0/−1, the UE receiving the information increases/keeps/decreases the currently set maximum allowable data rate by a predetermined level depending on the received information. The relative grant is transmitted over an Enhanced Relative Grant Channel (E-RGCH).

The foregoing rate scheduling method can reduce the signaling overhead of the downlink because the required amount of transmission information is small. However, to abruptly increase the data rate, the method requires a long time. Because the relative grant requires 1 bit, there is a possible alternative scheduling method for defining a unique transmission time for each UE in one shared channel on a time multiplexing basis, or allocating a unique orthogonal code to each UE.

The time and rate scheduling method, which controls even the time that the UE transmits the E-DCH, can only schedule some of multiple UEs and abruptly increase or decrease the data rate. The time and rate scheduling method delivers information using an absolute grant. In the absolute grant-based scheduling method, Node B transmits a value of the maximum data rate scheduled to a desired UE, and the UE receiving the value sets the maximum allowable data rate based on the received information.

For example, if the UE has the maximum allowable data rate of 16 kbps and has a lot of data to transmit, Node B can allocate a corresponding data rate such that the UE can transmit the data at up to 568 kbps in the next scheduling period.

In the time and rate scheduling method, Node B should be aware of the maximum allowable data rate of the UE. The maximum allowable data rate is determined according to a TF set value allocated to the UE. This is called a 'Node-B pointer'.

Because the time and rate scheduling method increases in the required amount of information to provide the absolute grant to the UE as described above, if each individual UE uses its own dedicated channel, transmission power of the downlink increases. Therefore, HSDPA transmits the absolute grant using a shared channel such as High Speed Shared Control Channel (HS-SCCH), and can transmit a UE identifier (UE-id) together to indicate that the absolute grant is information signaled to the corresponding UE. The channel used for transmitting the absolute grant is called an Enhanced Shared Control Channel (E-SCCH).

Because both of the foregoing two scheduling methods have merits and demerits, the uplink packet transmission system needs to be designed such that it supports both the rate scheduling method and the time and rate scheduling method to meet the delay requirements of the UEs, contributing to a reduction in the signaling overhead.

Next, a description will be made of a method for transmitting an Enhanced Absolute Grant Channel (E-AGCH) used for transmitting the absolute grant. The E-AGCH contains the absolute grant and is transmitted over a shared channel because there is no need for all UEs in a cell to perform scheduling in the absolute grant-based scheduling method every Transmit Time Interval (TTI). A UE-id is allocated in the E-AGCH to indicate that the E-AGCH is information signaled to the corresponding UE, and the UE performs Cyclic Redundancy Check (CRC) thereon. If the UE succeeds in the CRC, the UE transmits an E-DCH using corresponding information, determining that the corresponding information is transmitted thereto.

A description will now be made of an operation in a soft handover (SHO) state in which several Node Bs exits in the system using both the absolute grant and the relative grant.

The absolute grant-based scheduling method is higher in channel decoding complexity than the relative grant-based scheduling method, because the E-AGCH contains a lot of information and uses high power. Therefore, receiving the absolute grant only from one Node B is preferable. In this instance, the one Node B transmitting the absolute grant is called a 'serving Node B', and a Node B having the best downlink is selected as the serving Node B in a predetermined procedure or HSDPA. That is, a UE in the SHO state receives both the absolute grant and the relative grant from the serving Node B among several Node Bs, and receives only the relative grant from the other Node Bs, that is, non-serving Node Bs, except for the serving Node B.

Instead of signaling all of up/down/keep (or increment/decrement/keep) used in the general relative grant-based scheduling method, the non-serving Node B, which has no scheduling right for the corresponding UE, commands the UE to decrease the data rate (Down Command) taking into account the ROT conditions of the current cell if a ratio of ROT of other UEs in the SHO state is high, and otherwise, transmits no signal (Don't Care) to allow each of the UEs to follow scheduling of its own serving Node B. The information used for controlling the data rate in this manner is called an 'overload indicator'. In the foregoing case, it is possible to either signal the overload indicator to all UEs on a dedicated basis, or signal the overload indicator to all the UEs on a common basis taking the downlink signaling overhead into account.

FIG. 3 is a diagram illustrating a SHO state in which one UE receives scheduling information from several Node Bs.

Referring to FIG. 3, the number of cells (cell#1 to cell#5) included in an active set of a UE 301 is five, and the five cells include two cells 321 and 322 managed by a Node B1 311, two cells 323 and 324 managed by a Node B2 312, and a cell 325 managed by a Node B3 313.

The cell#1 321 is set as a serving cell that can transmit an absolute grant to the UE 301, and the UE 301 receives an E-AGCH and an E-RGCH from the serving cell 321. However, the UE 301 receives only the E-RGCH, a relative grant transport channel, from the cell#2 322 to the cell#5 325 except for the serving cell 321. Different cells managed by one Node B can transmit the same relative grant for one UE. That is, a set of radio links managed by a Node B among several radio links where one UE 301 exits (one radio link exists in one cell for one UE) is called a 'radio link set (RLS)'. In FIG. 3, because the number of Node Bs participating in the soft handover is three, there are three RLSs 331, 332 and 333. In an exemplary implementation, an RLS related to a serving Node B will be referred to as a "serving RLS," and an RLS related to a non-serving Node B will be referred to as a "non-serving RLS."

When a UE consecutively receives Down commands from different RLSs in a SHO state, the current WCDMA system uses a method of setting a timer each time the WCDMA system issues a Down command so that the UE no longer decreases its data rate, even though the UE receives another Down command within a predetermined time, in order to prevent the data rate from abruptly decreasing. This method is generally called a 'hysteresis method', and the predetermined time is called a 'hysteresis period'.

FIG. 4 is a diagram illustrating an exemplary operation of a UE in the SHO state of FIG. 3. In FIG. 4, X represents "keep" for a serving RLS, and "don't care" for a non-serving RLS. In addition, it is assumed that scheduling commands are received over an E-RGCH every 10 ms, and a hysteresis period is set to 20 ms.

Referring to FIG. 4, scheduling commands on the E-RGCH are transmitted from an RLS2 420 and an RLS3 430, both which are non-serving RLSs. Each time the UE receives Down commands 421 to 424 and 431 to 433 among the scheduling commands, the UE checks whether it has ever reduced its data rate for their previous hysteresis periods 451 to 457. The UE decreases its data rate according to the received commands if it has decreased the data rate. Otherwise, the UE keeps the current data rate.

Specifically, when receiving Down commands 421, 422 and 423, the UE decreases its data rate according to the received commands at times 461 to 463 because the UE has decreased the data rate for their previous hysteresis periods 451, 453 and 456. However, when receiving the other Down commands 424, 431, 432 and 433, the UE keeps its current data rate at times 461 to 463 because it has decreased the data rate for their previous hysteresis periods.

However, in this data rate decreasing method, when the UE receives consecutive Down commands (423, 424) and (432, 433) from one RLS, because the UE cannot consecutively receive Down commands, uplink radio resources of the corresponding cell that transmitted the Down commands may continue in the overload state.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method in which, when receiving consecutive Down commands for a time period, a UE can decrease its data rate on several occasions.

According to one aspect of exemplary embodiments of the present invention, there is provided a method for controlling a data rate by a user equipment (UE) that receives a scheduling command for uplink data transmission from a non-serving Node B in a mobile communication system that transmits packet data over an uplink, in which a down command is received for decreasing an allowable data rate of the UE from radio link sets (RLSs) of the non-serving Node Bs, and a number of down commands received from each of the RLSs for a hysteresis period is counted; the number of down commands executed for the hysteresis period is counted; the number of received down commands is compared with the number of executed down commands; and the allowable data rate of the UE is controlled by executing the down command according to the comparison result.

According to another aspect of exemplary embodiments of the present invention, there is provided an apparatus for controlling a data rate by a user equipment (UE) that receives a scheduling command for uplink data transmission from a non-serving Node B in a mobile communication system that transmits packet data over an uplink, in which a scheduling command receiver receives a down command for decreasing an allowable data rate of the UE from radio link sets (RLSs) of the non-serving Node Bs; a down command reception counter counts the number of down commands received from each of the RLSs for a hysteresis period; a down command execution counter counts the number of down commands executed for the hysteresis period; and a down command execution decision unit compares the number of received down commands with the number of executed down commands, and determines whether to execute the down command according to the comparison result.

BRIEF DESCRIPTION OF THE DRAWINGS

The above and other objects, features and advantages of certain exemplary embodiments of the present invention will be more apparent from the following detailed description when taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

First, a definition of the parameters used herein will be given below.

ND_Real indicates the number of Down commands actually executed for an interval from a time determined by subtracting a hysteresis period from the present time to the present time.

ND_RLS(i) indicates the number of Down commands received from a non-serving RLS #i for an interval from a time determined by subtracting a hysteresis period from the present time to the present time, and 'i' denotes an identification number of the corresponding cell.

L_Real indicates a set of all Down commands actually executed for an interval from a time determined by subtracting a hysteresis period from the present time to the present time.

L(i) indicates a set of all Down commands received from a non-serving RLS #i for an interval from a time determined by subtracting a hysteresis period from the present time to the present time.

T_Real(k) indicates a timer for counting a hysteresis period of an actually executed Down command #k, and this value is initially set as a hysteresis period and then decreases until it becomes zero as time goes by.

T_(j) indicates a timer for counting a hysteresis period of a Down command #j received from a non-serving RLS, and this value is also initially set as a hysteresis period and then decreases until it becomes zero as time goes by.

In an exemplary embodiment of the present invention, a UE manages ND_Real, and ND_RLS(i) for all non-serving RLS #i. When receiving a Down command as a relative grant from a non-serving RLS, the UE decreases its allowable data rate if ND_RLS(i) is greater than ND_Real for a particular RLS #i. Otherwise, the UE keeps its current allowable data rate.

Figure 5:
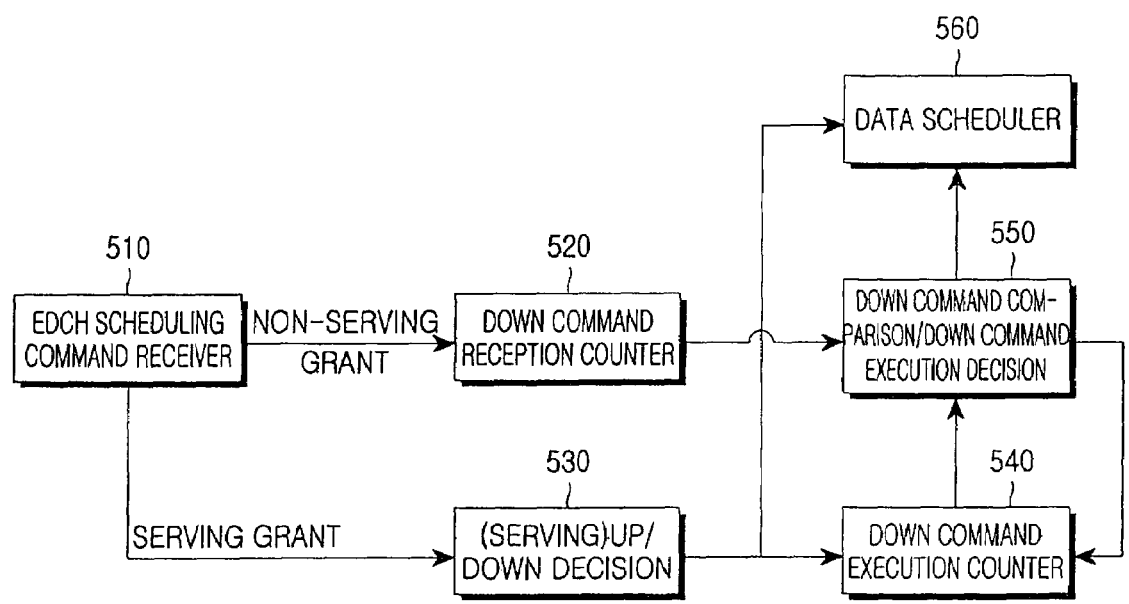
FIG. 5 is a block diagram illustrating a structure of a UE according to an exemplary embodiment of the present invention.

FIG. 5 is a block diagram illustrating a structure of a UE according to an exemplary embodiment of the present invention.

Referring to FIG. 5, a UE according to an exemplary embodiment of the present invention includes an EDCH scheduling command receiver 510, Down command reception counter 520, (Serving)Up/Down decision unit 530, Down command execution counter 540, Down command comparison/Down command execution decision unit 550, and data scheduler 560.

The EDCH scheduling command receiver 510 receives an EDCH command from each RLS and delivers the received EDCH command to the Down command reception counter 520 or the (Serving)Up/Down decision unit 530. For example, the EDCH scheduling command receiver 510 delivers a scheduling command received from a serving RLS to the (Serving)Up/Down decision unit 530, and delivers a scheduling command received from a non-serving RLS to the Down command reception counter 520.

The (Serving)Up/Down decision unit 530 makes an Up/Down decision upon receiving a scheduling command from the serving RLS. Upon receiving an absolute grant from an E-AGCH, the (Serving)Up/Down decision unit 530 sets an allowable data rate according to the scheduling command if a reception time of the absolute grant information has passed by a hysteresis period from the time that the previous command was executed. Otherwise, the (Serving)Up/Down decision unit 530 sets the maximum allowable data rate to a lower data rate included in the received absolute grant and the current allowable data rate. Upon receiving a relative grant (up/down/keep) from an E-RGCH, the (Serving)Up/Down decision unit 530 sets an allowable data rate according to the scheduling command if a reception time of the relative grant information has passed by a hysteresis period from the time that the previous command was executed. Otherwise, the (Serving)Up/Down decision unit 530 sets the maximum allowable data rate to a lower data rate included in the received relative grant and the current allowable data rate.

The scheduling information set in the (Serving)Up/Down decision unit 530 is delivered to the data scheduler 560, and is delivered to the Down command execution counter 540 if the updated allowable data rate is lower than the previous data rate.

The Down command reception counter 520 counts how many Down commands it has received for a hysteresis period for every RLS, and then transmits the Down command reception count result to the Down command comparison/Down command execution decision unit 550.

The Down command comparison/Down command execution decision unit 550 compares the number of Down commands for each RLS counted in the Down command reception counter 520 with the number of Down commands counted in the Down command execution counter 540, and determines whether to execute the Down command. The determined result is delivered to both the data scheduler 560 and the Down command execution counter 540.

Figure 6:
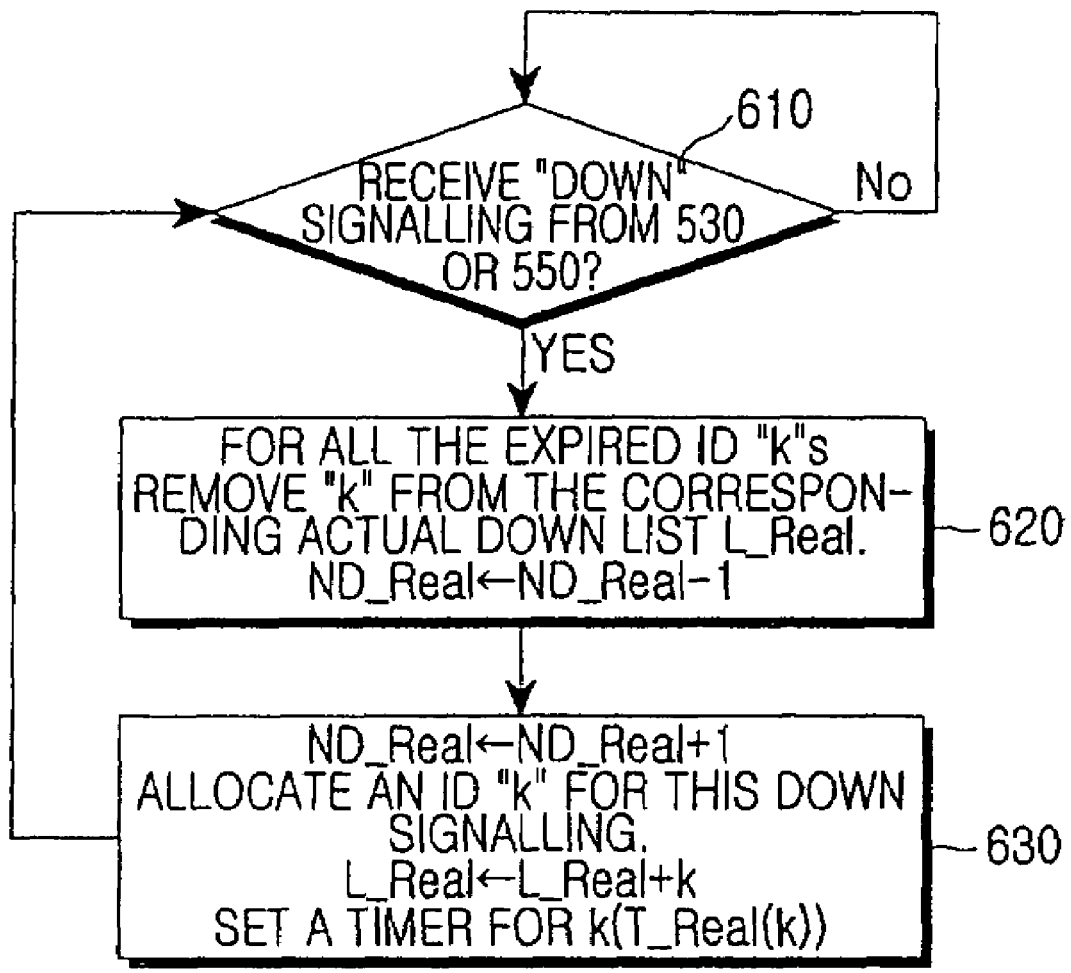
FIG. 6 is a flowchart illustrating an operation of a Down command execution counter of a UE according to an exemplary embodiment of the present invention.
Figure 7:
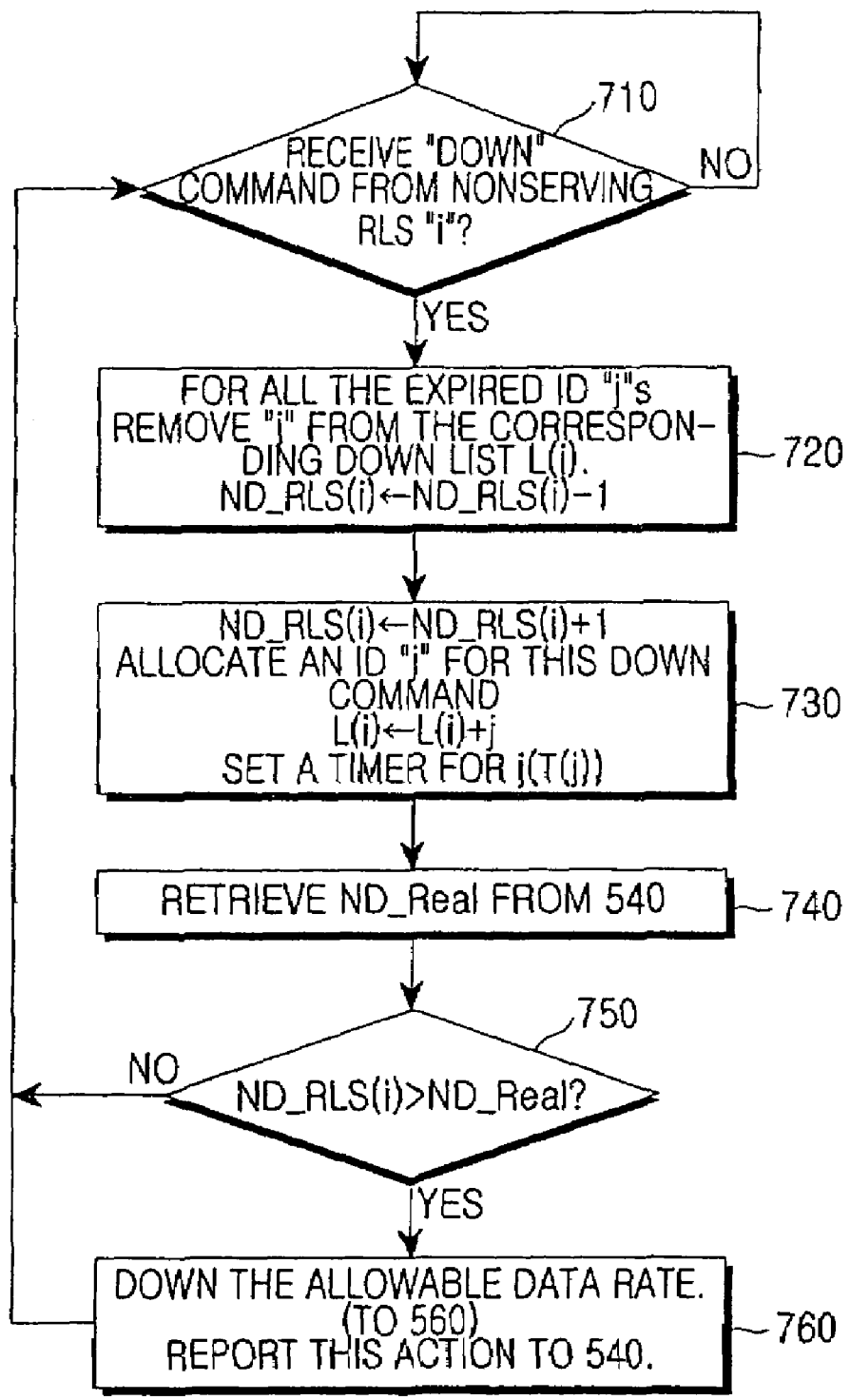
FIG. 7 is a flowchart illustrating operations of a Down command reception counter and a Down command comparison/Down command execution decision unit of a UE according to an exemplary embodiment of the present invention.

With reference to FIGS. 6 and 7, a description will now be made of a process of determining to decrease an allowable data rate according to an exemplary embodiment of the present invention in the Down command execution counter 540, the Down command reception counter 520 and the Down command comparison/Down command execution decision unit 550 of FIG. 5.

FIG. 6 is a flowchart illustrating an operation of a Down command execution counter 540 of a UE according to an exemplary embodiment of the present invention.

Referring to FIG. 6, the Down command execution counter 540 determines in step 610 whether a (Serving)Up/Down decision unit 530 or a Down command comparison/Down command execution decision unit 550 has decided to decrease an allowable data rate according to a Down command. If it is determined that the (Serving)Up/Down decision unit 530 or the Down command comparison/Down command execution decision unit 550 has decided to decrease the allowable data rate, the Down command execution counter 540 removes in step 620 Down commands whose hysteresis periods have expired among the previously executed Down commands, from a memory. That is, the Down command execution counter 540 removes all Down commands #k with $T\_Real(k)=0$ from $L\_Real$, and decreases an $ND\_Real$ value by the number of the removed commands.

In step 630, the Down command execution counter 540 adds new Down commands received from the (Serving)Up/Down decision unit 530 or the Down command comparison/Down command execution decision unit 550 to the memory for the hysteresis. That is, the Down command execution counter 540 increases the $ND\_Real$ value by one, assigns a unique ID k to a new Down command, adds the k to $L\_Real$, and sets $T\_Real(k)$, which is a hysteresis timer, for the k.

FIG. 7 is a flowchart illustrating operations of a Down command reception counter 520 and a Down command comparison/Down command execution decision unit 550 of a UE according to an exemplary embodiment of the present invention.

Referring to FIG. 7, the Down command reception counter 520 determines in step 710 whether there is a Down command received from an RLS #i. If it is determined that there is a received Down command, the Down command reception counter 520 removes the Down commands with the hysteresis period expired among the previously received Down commands from a memory in step 720. In this instance, the Down command reception counter 520 removes all 'j's with $T(j)=0$ (where j denotes an ID of a Down command) from $L(i)$, which is the corresponding Down command list, and decreases an $ND\_RLS(i)$ value by the number of the commands removed from $L(i)$. In step 730, the Down command reception counter 520 performs a process of adding a new Down command to the memory for hysteresis. In this process, the Down command reception counter 520 increases the $ND\_RLS(i)$ value by one, assigns a unique ID j to the new Down command, adds the j to $L(i)$, and sets $T(j)$, which is a hysteresis timer, for the j.

In step 740, the Down command comparison/Down command execution decision unit 550 acquires an $ND\_Real$ value from the Down command execution counter 540, and compares the $ND\_Real$ value acquired in step 750 with the $ND\_RLS(i)$ value updated in step 730.

If the $ND_{13}RLS(i)$ value is greater than the $ND\_Real$ value as a result of the comparison, the Down command comparison/Down command execution decision unit 550 delivers a signal indicating actual execution of the Down command to the data scheduler 560 and the Down command execution counter 540 in step 760.

Figure 1:
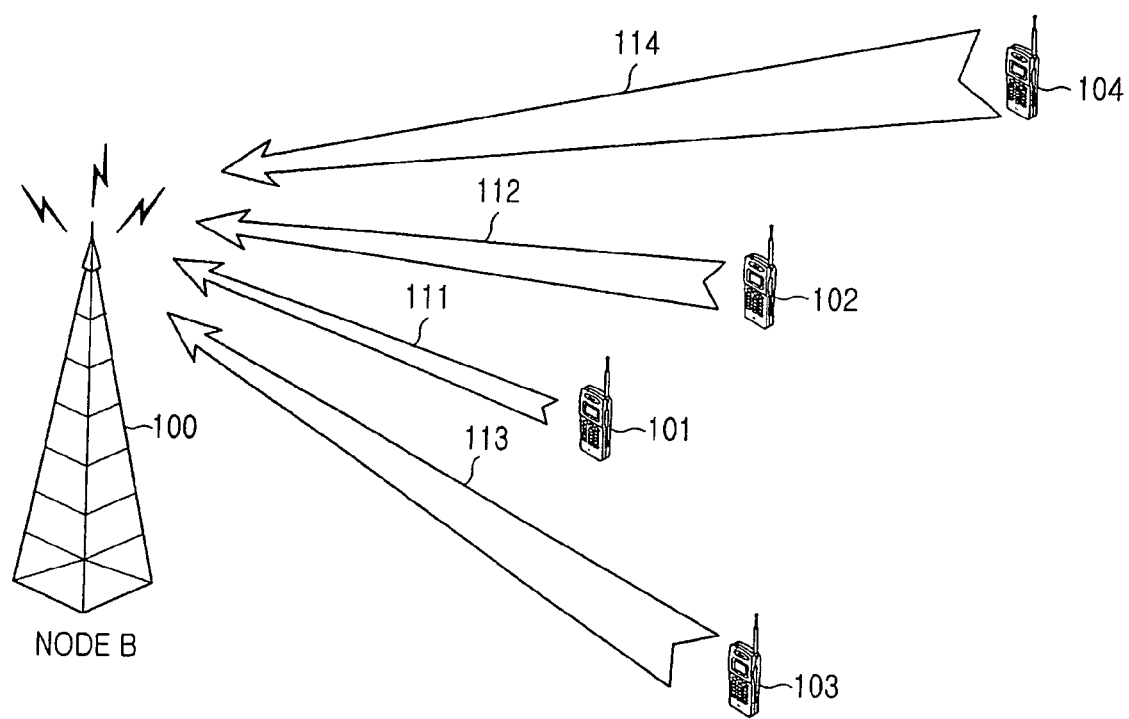
FIG. 1 is a conventional diagram which shows where E-DCH may be used.
Figure 2:
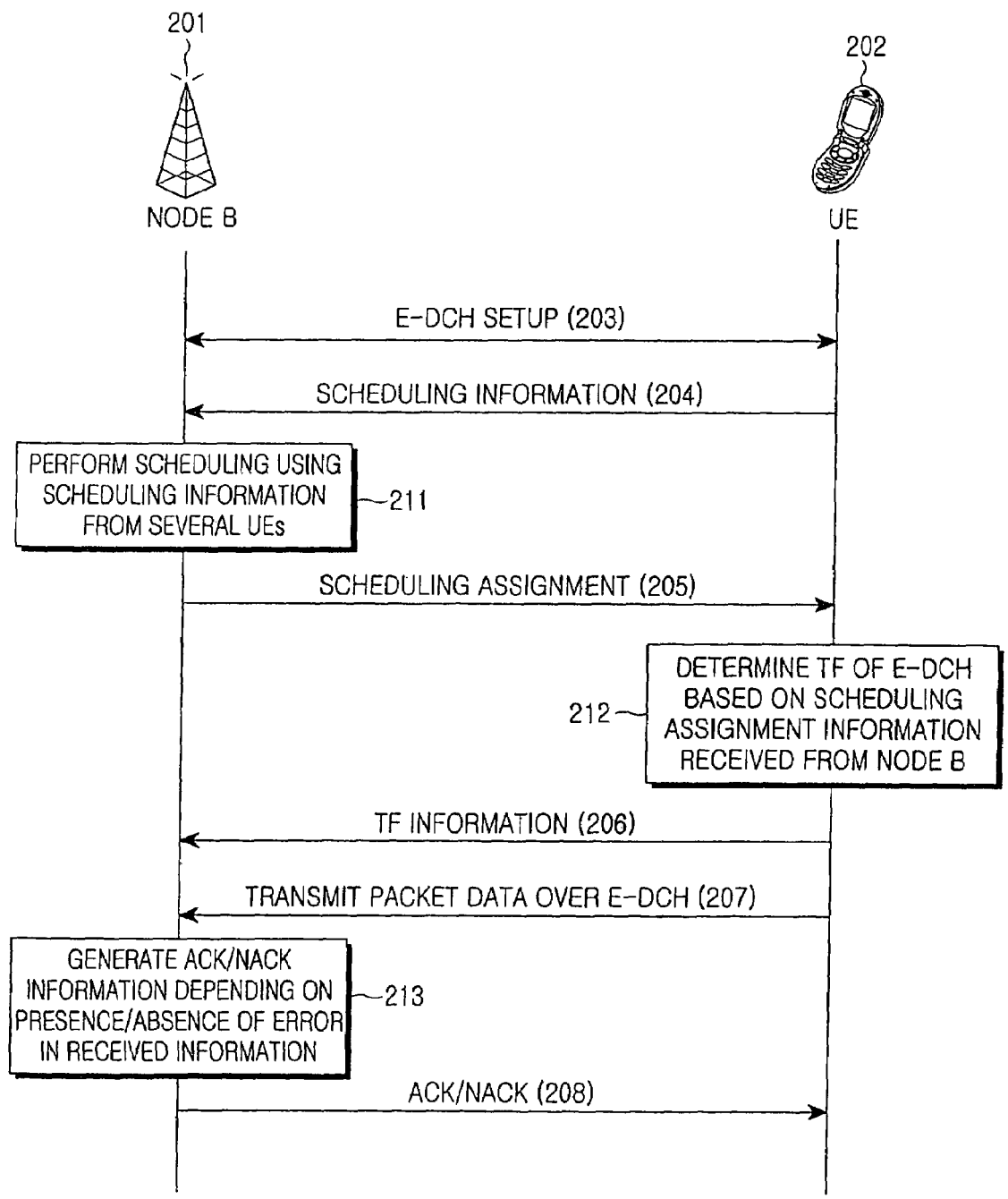
FIG. 2 is a ladder diagram illustrating a conventional procedure for transmitting/receiving an E-DCH.
Figure 3:
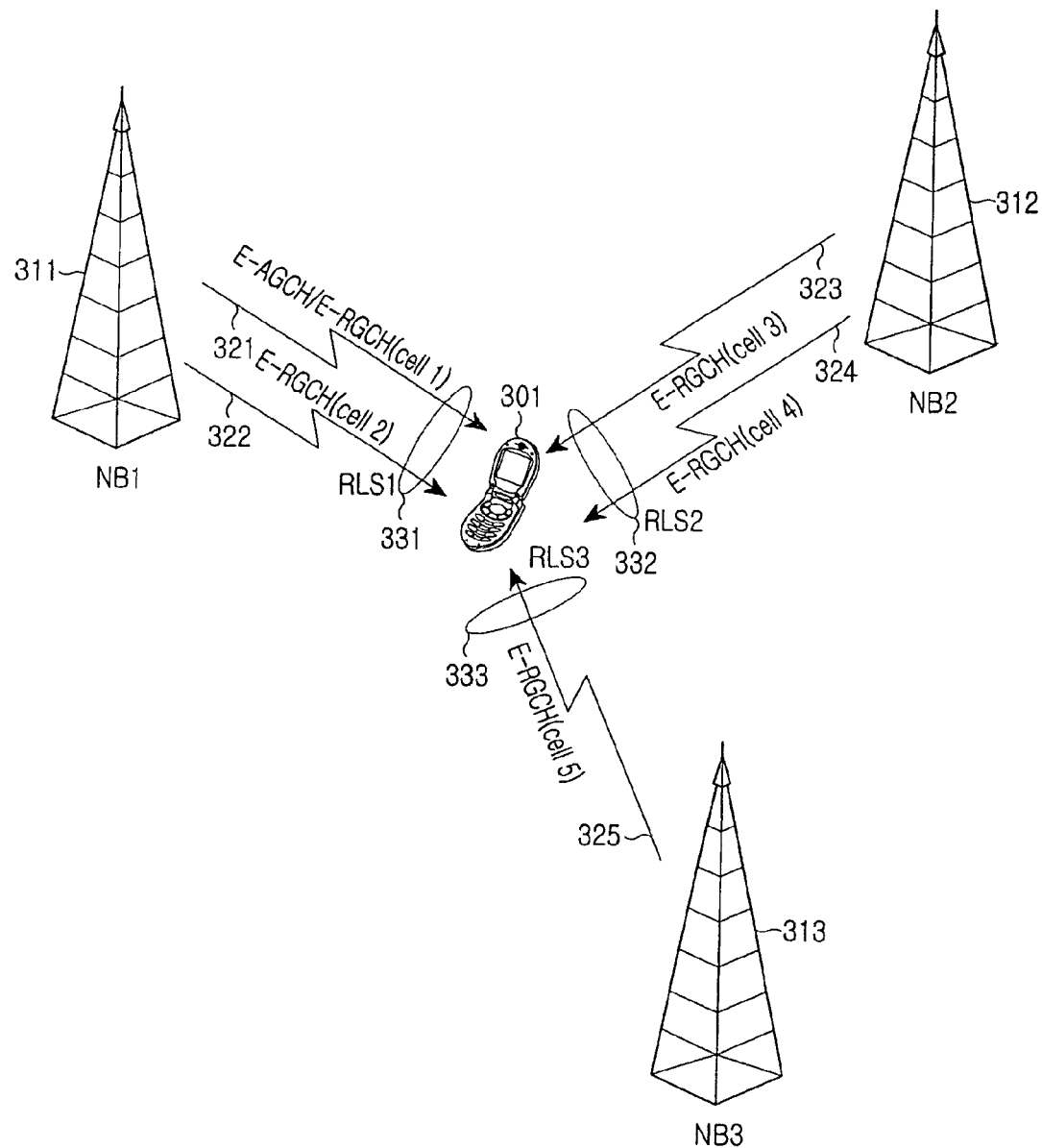
FIG. 3 is a diagram illustrating a SHO state in which one UE receives scheduling information from several Node Bs.
Figure 4:
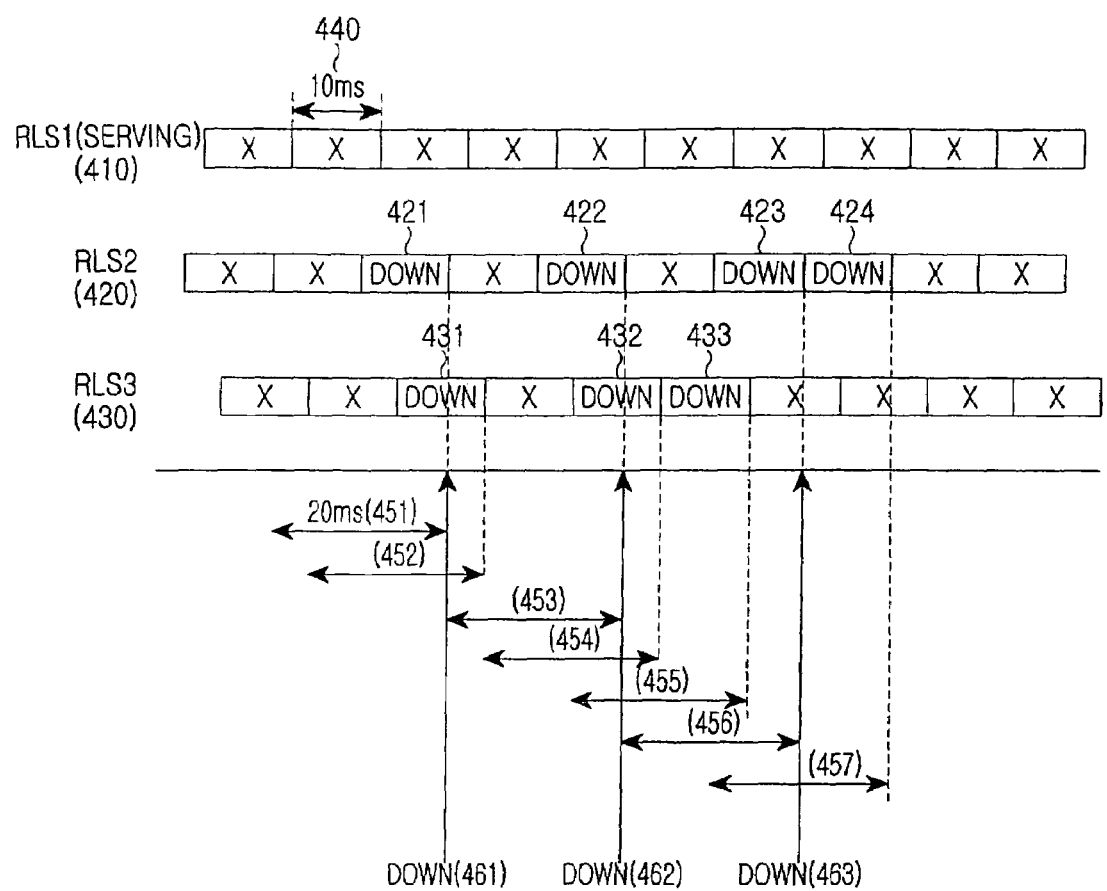
FIG. 4 is a diagram illustrating an exemplary operation of a UE in the SHO state of FIG. 3.
Figure 8:
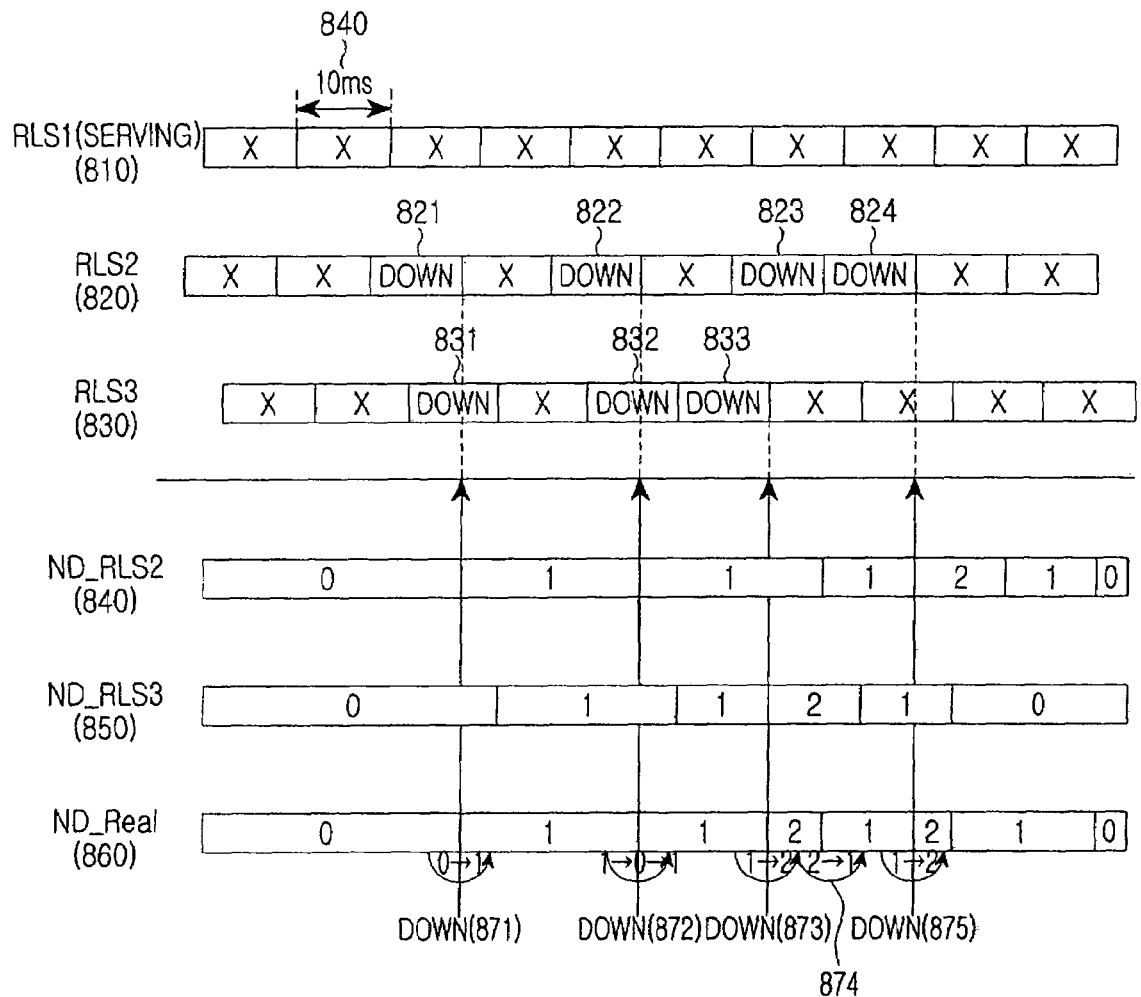
FIG. 8 is a diagram illustrating an exemplary operation of a UE according to an exemplary embodiment of the present invention.

FIG. 8 is a diagram illustrating an exemplary operation of a UE according to an exemplary embodiment of the present invention. In an exemplary implementation, an assumption is made that the Down command is received in the same way as in FIG. 4. In addition, a hysteresis period is also set to 20 ms.

Referring to FIG. 8, a description will now be made of a change in an ND_RLS2 840, an ND_RLS3 850 and an ND_Real 860 with the passage of time according to an exemplary embodiment of the present invention, when Down commands 821 to 824 and 831 to 833 are received in an RLS2 820 and an RLS3 830, both of which are non-serving RLSs.

First, when the Down command 821 is received in the RLS2 820, the $ND_{13}$ RLS2 840 is updated from 0 to 1. At this point, because an ND_Real value is 0, Down command is actually executed at a time 871. After the Down command is executed, the ND_Real value is updated from 0 to 1.

Thereafter, if the UE receives the Down command 831 from the RLS3 830, the ND_RLS3 850 is updated from 0 to 1. At this point, because the current ND_Real value is 1, like the ND_RLS3 850, the UE does not execute the Down command.

Next, when the UE receives a Down command 822 from the RLS2 820, a hysteresis timer T1 at the reception time of the Down command 821 is 0. Therefore, the ND_RLS2 840 is instantaneously changed from 1 to 0, and then changed back from 0 to 1 if the Down command 822 is received again. Similarly, the ND_Real value 860 is also updated from 1 to 0 when T1 is 0, and the ND_RLS2 value 840 becomes 1 when the Down command 822 is received. At this point, because the ND_Real value 860 is 0 and smaller than the ND_RLS2 value 840, the UE actually executes the Down command 822 at a time 872. After the Down command is executed, the ND_Real value 860 is updated back to 1.

At the time that a Down command 832 is received from the RLS 830, because the ND_RLS3 value 850 is 1, like the ND_Real value 860, the UE does not actually execute the Down command 832. Next, if a Down command 833 is received, the ND_RLS3 value 850 increases from 1 to 2. Therefore, the ND_RLS3 value 850 of 2 is greater than the current ND_Real value 860 of 1, so the UE actually executes the Down command 833 at a time 873. After the Down command 833 is executed, the ND_Real value 860 is updated to 2.

Next, at the time that the UE receives a Down command 823, the ND_RLS2 value 840 is instantaneously changed in the order of 1→0→1, and the ND_Real value 860 is updated from 2 to 1. Because the ND_Real value 860 of 1 is not smaller than the final ND_RLS2 value 840 of 1, the UE does not execute the Down command 823 at a time 874.

Thereafter, if the UE receives a Down command 824 from the RLS2 820, the ND_RLS2 value 840 is changed from 1 to 2. At this time, because the ND_Real value 860 is 1, the UE actually executes the Down command 824 at a time 875, and increases the ND_Real value 860 by 1.

As described above, if a Down command is received from a particular RLS every hysteresis period (20 ms in FIG. 8), an ND_Real value and an ND_RLS(i) value are instantaneously changed in the order of N→N−1→N. Therefore, such a phenomenon can be prevented by setting the hysteresis period value to a value, for example, 19 ms, slightly smaller than a desired actual hysteresis value, for example, 20 ms.

According to an exemplary embodiment of the present invention, it can be noted that when two Down commands are consecutively received from a particular RLS, the number of Down commands received for 20 ms is 2. That is, in FIG. 8, the UE executes Down commands at 873 and 875 when it receives Down commands 823 and 824 from the RLS2 820, and the UE executes Down commands at 872 and 873 when it receives Down commands 832 and 833 from the RLS2 830.

As can be understood from the foregoing description, in the mobile communication system that transmits packet data over an uplink, even when a UE consecutively receives several uplink data transmission scheduling commands from a non-serving Node B, the UE can decrease its data rate several times for a predetermined time.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for controlling a data rate by a user equipment (UE), the method comprising:
   receiving a down command for decreasing an allowable data rate of a user equipment (UE) from at least one of radio link sets (RLSs) of at lease one of non-serving Node Bs, and counting the number of down commands received from each of the RLSs for a hysteresis period;
   counting the number of down commands executed for the hysteresis period;
   comparing the number of received down commands with the number of executed down commands; and
   controlling the allowable data rate of the UE by executing the down command according to the comparison result.

2. The method of claim 1, further comprising, after the executing of the down command, decreasing the number of executed down commands by the number of down commands whose hysteresis periods expired among the down commands executed before the down command is received, and increasing the number of executed down commands by 1.

3. The method of claim 1, wherein the counting of the number of received down commands comprises, upon receiving the down command from each of the RLSs of the at least one of the non-serving Node Bs, decreasing the number of received down commands by the number of down commands whose hysteresis periods expired among the down commands previously received from the RLS, and increasing the number of received down commands by 1.

4. The method of claim 1, wherein the controlling of the allowable data rate of the UE comprises decreasing the allowable data rate of the UE according to the received down command, if the number of received down commands is greater than the number of executed down commands, and keeping the allowable data rate of the UE, if the number of received down commands is less than or equal to the number of executed down commands.

5. The method of claim 1, wherein the UE receives a scheduling command for uplink data transmission from a non-serving Node B in a mobile communication system that transmits packet data over an uplink.

6. An apparatus for controlling a data rate by a user equipment (UE, the apparatus comprising:
   a scheduling command receiver for receiving a down command for decreasing an allowable data rate of a user equipment (UE) from at least one of radio link sets (RLSs) of at least one of non-serving Node Bs;
   a down command reception counter for counting the number of down commands received from each of the RLSs for a hysteresis period;
   a down command execution counter for counting the number of down commands executed for the hysteresis period; and
   a down command execution decision unit for comparing the number of received down commands with the number of executed down commands, and determining whether to execute the down command according to the comparison result.

7. The apparatus of claim 6, wherein after execution of the down command, the down command execution counter decreases the number of executed down commands by the number of down commands whose hysteresis periods expired among the down commands executed before the down command is received, increases the number of executed down commands by 1, and resets a timer for counting the hysteresis period for the executed down command.

8. The apparatus of claim 6, wherein upon receiving the down command, the down command reception counter decreases the number of received down commands by the number of down commands whose hysteresis periods expired among the previously received down commands, increases the number of received down commands by 1, and resets a timer for counting the hysteresis period for the received down command.

9. The apparatus of claim 6, wherein the down command execution decision unit determines to execute the received down command, if the number of received down commands is greater than the number of executed down commands, and determines not to execute the received down command, if the number of received down commands is less than or equal to the number of executed down commands.

10. The apparatus of claim 6, further comprising a data scheduler for controlling an allowable data rate of the UE according to the decision result of the down command execution decision unit.

11. The apparatus of claim 6, wherein the UE receives a scheduling command for uplink data transmission from a non-serving Node B in a mobile communication system that transmits packet data over an uplink.

* * * * *